Feb. 4, 1958 D. W. FENTRESS 2,822,194
HIGH PRESSURE EXPANSION JOINT WITH BELLOWS AND
REINFORCING RINGS AND METHOD OF MAKING SAME
Filed Aug. 13, 1951 2 Sheets-Sheet 1
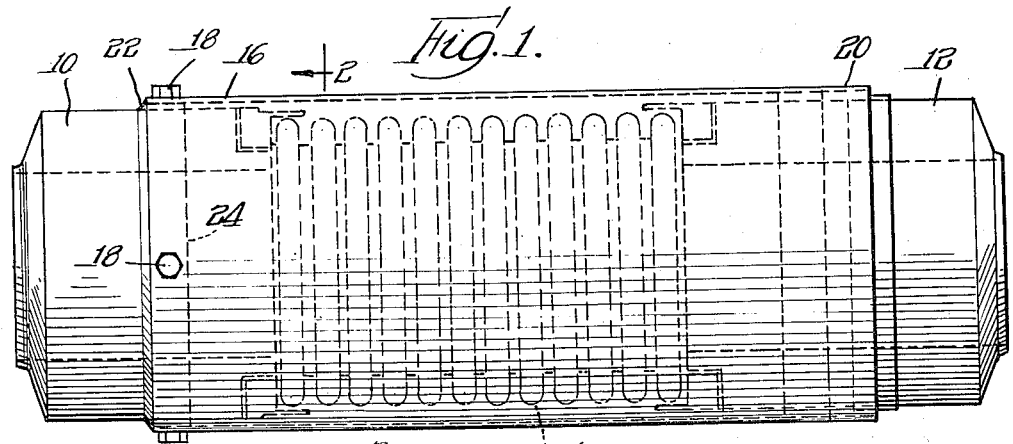
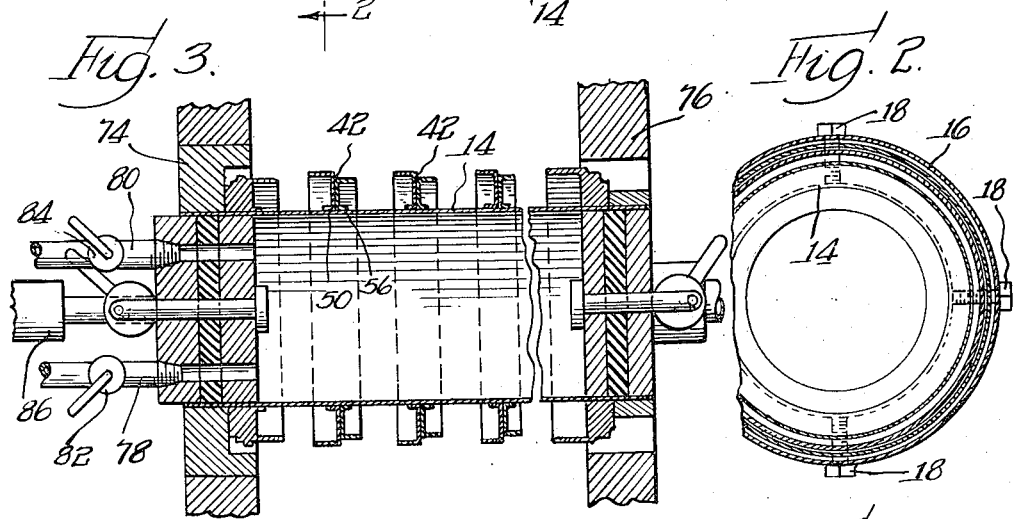
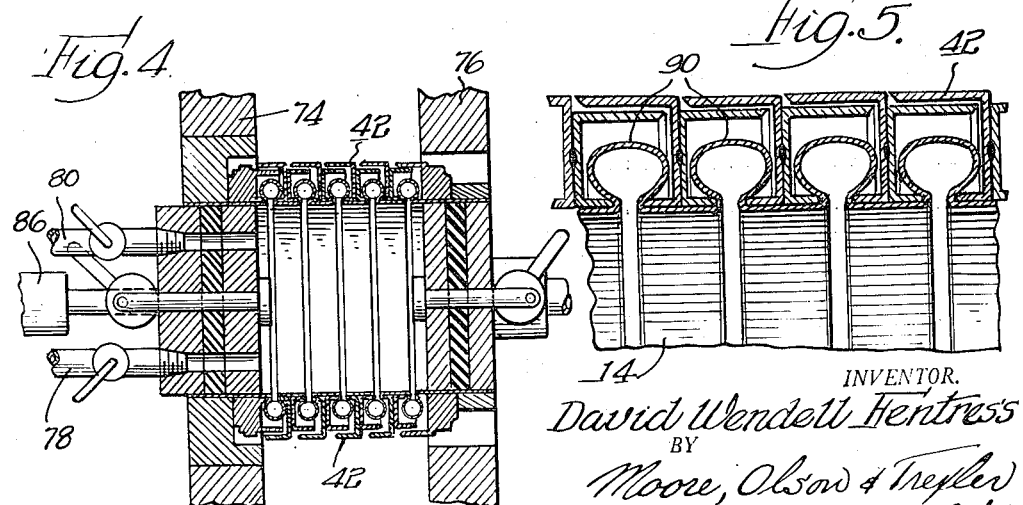
INVENTOR.
David Wendell Fentress
BY
Moore, Olson & Trexler
Attys.

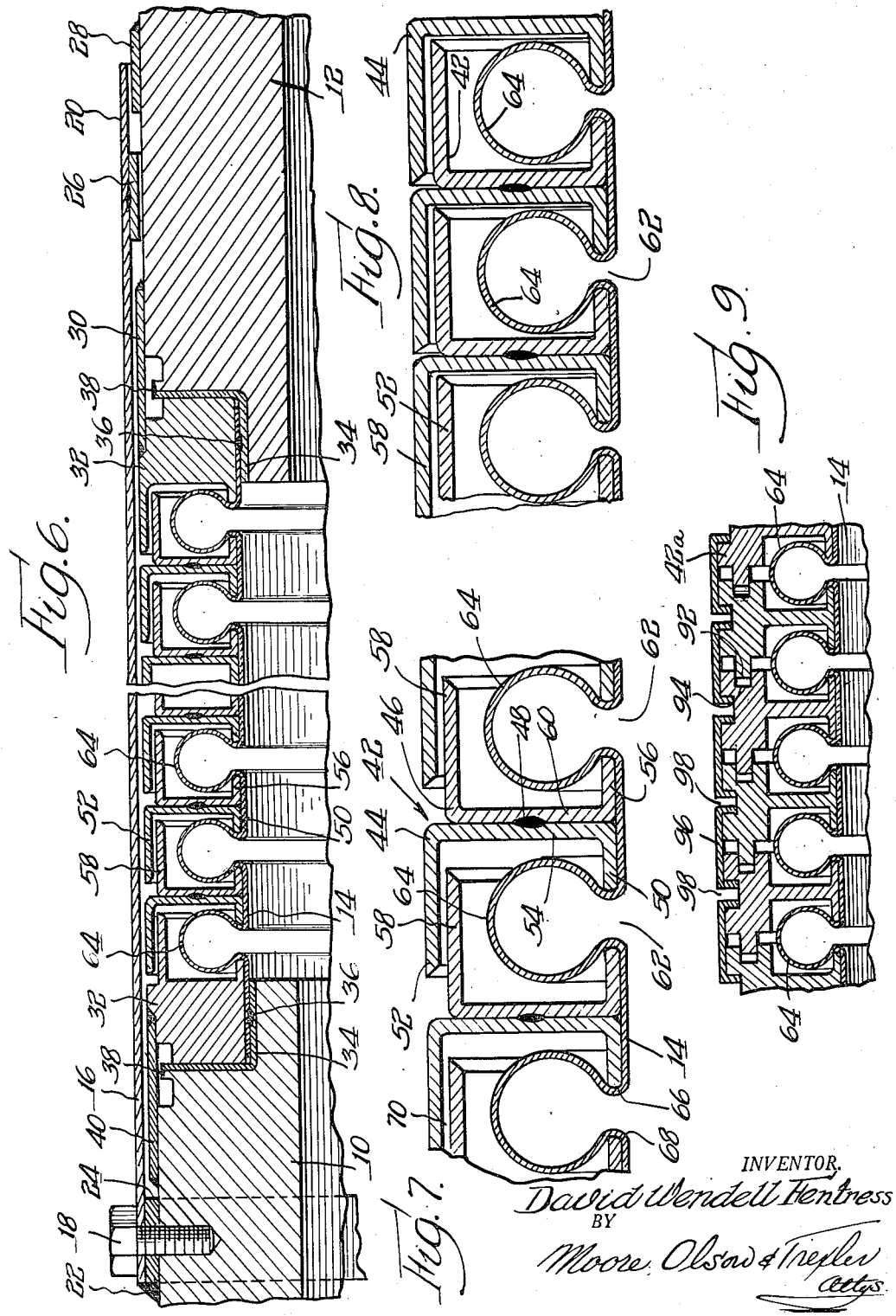

United States Patent Office 2,822,194
Patented Feb. 4, 1958

2,822,194

HIGH PRESSURE EXPANSION JOINT WITH BELLOWS AND REINFORCING RINGS AND METHOD OF MAKING SAME

David Wendell Fentress, Barrington, Ill., assignor to Flexonics Corporation, a corporation of Illinois Application August 13, 1951, Serial No. 241,662

4 Claims. (Cl. 285—299)

This invention relates to flexible tubing structures, and concerns particularly high pressure expansion joints, and their method of manufacture.

One form of cross section which may be imparted to the corrugations of annularly corrugated metal tubing in a cross section wherein the opposed side walls of the corrugation join the tube body at an acute angle so that the side walls converge toward each other at the base thereof, as distinguished from more conventional types such as V or U-shaped cross sections. The cross section of the corrugation in such instance may be essentially circular, or it may be of modified circular or oval form, and for want of a better term will be referred to herein as "nodal" type tubing. Certain advantages result from the nodal cross sectional shaping, such for example as increased smoothness in the tubing bore, and greater strength in relation to the thickness of the tubing wall. Thus with nodal cross sectional corrugations for a given tubing wall thickness higher internal fluid pressures may be used; or stated conversely, for a given fluid pressure resistance thinner tubing wall thicknesses may be employed, with resulting greater flexibility. The increased strength characteristics of the nodal cross sectioned corrugation result from the fact that the applied fluid pressures do not tend to distort the shaping of the corrugation, materially, but tend rather, merely to put the corrugation wall section into tension, a type of stress to which the wall section is strongly resistive.

While advantages thus result from tubing with nodal cross sectioned corrugations, difficulties are encountered in the manufacture or production of such corrugations, and in the application of reinforcing rings thereto in instances where required. The nodal shaped cross section is inherently difficult to produce, by ordinary means. Also, in instances wherein reinforcement rings are necessary or desirable, difficulty is encountered in the assembly of such rings onto the tubing, and in the satisfactory adaptation of rings to the tubing so that the functioning of the parts is properly correlated, and occurs without interference in use. While the nodal shaping of the corrugations reduces the necessity for reinforcement rings in some instances, and in some installations; in other instances and installations the use of reinforcing rings becomes highly desirable, or required.

In accordance with the present invention a flexible tubing structure, and specifically an expansion joint, is provided wherein a nodal cross sectional shaping is imparted to the tubing corrugations, in an improved manner; and wherein reinforcing rings are applied to the tubing, in connection with the manufacture thereof, the rings being of a character and shaping which enables their proper functioning with the nodally cross sectioned corrugations of the tubing, in the use of the structure under service conditions.

It is an object of the invention to provide a flexible tubing structure, and specifically an expansion joint, of improved construction and improved operating characteristics.

More specifically stated it is an object of the invention to provide a flexible tubing structure or expansion joint of the type defined, having nodally cross sectioned corrugations, and wherein the tubing is corrugated in an improved and more readily operable manner.

A further object of the invention is to provide an improved flexible tubing structure, or expansion joint, employing reinforcing rings in combination with tubing corrugations of nodal cross section, the rings cooperating with the corrugations to promote the proper functioning thereof, in use.

A still further object of the invention is to provide a high pressure expansion joint, of improved construction and design, having increased strength and safety in relation to its flexibility, and adapted for service in extremely high pressure installations where an appreciable measure of flexibility is required.

Various other objects, advantages and features of the invention will be apparent from the following specification when taken in connection with the accompanying drawings wherein certain preferred embodiments are set forth for purposes of illustration.

In the drawings, wherein like reference numerals refer to like parts throughout:

Fig. 1 is a general assembly view of a tubing structure, and specifically an expansion joint, constructed in accordance with and embodying the principles of the present invention, in accordance with one preferred embodiment thereof;

Fig. 2 is a transverse sectional view of the structure of Fig. 1 taken as indicated by the line 2—2 thereof;

Figs. 3 and 4 are sequential views, somewhat diagrammatic in form, showing apparatus and methods for producing the tubing corrugations, in combination with the reinforcing rings;

Fig. 5 is an enlarged view, similar to Fig. 4, but showing a modified tubing corrugation cross sectional form;

Fig. 6 is a partial longitudinal sectional view, on an enlarged scale, of the structure shown in Fig. 1, more particularly illustrating the shaping and functioning of the parts;

Fig. 7 is a further enlarged view of a portion of the structure of Fig. 6;

Fig. 8 is a view similar to Fig. 7, but showing the parts in a different operating position; and Fig. 9 is a partial view, generally similar to Fig. 6, but showing a modified structural embodiment of the invention.

Referring more particularly to the drawings, and first to the structural embodiment illustrated in Figs. 1–4 and 6–8, in Fig. 1 there is shown a flexible tubing structure, specifically a high pressure expansion joint, comprising a pair of end couplings or fittings 10 and 12, interconnected by a flexible tubing 14. As best shown in Figs. 1 and 6, a metal sleeve 16 encompasses the tubing, along the length thereof, the sleeve being anchored to the fitting 10, at one end by bolts 18, and loosely encompassing the fitting 12 at its other end 20. Specifically the sleeve 16 may be sealed to the fitting 10, by annularly welding the end thereof as indicated at 22, there being a mounting ring 24 interposed between the sleeve and the fitting to provide the necessary clearance between the parts.

The free end 20 of the sleeve carries an internal annular ring 26, Fig. 6, secured thereto as by welding, this ring being operable between a pair of stop rings 28 and 30 carried externally of the fitting 12, and welded thereto. The rings 26, 28 and 30 constitute abutment means, carried, respectively, by the sleeve and fitting, for limiting the axial movement of the sleeve, and for correspondingly limiting the overall movement of the tubing, as will be understood.

The tubing 14 is secured at its opposite ends to the fittings 10 and 12 by means of a pair of adapter rings 32, and associated flange members 34. The ends of the tubing are welded to the flange members, as indicated at 36, and the flange members are in turn welded to the fittings 10 and 12, respectively, as indicated at 38. The flange members, being of relatively thin sheet metal, may be welded without difficulty to the tubing, even though the latter is of very thin sheet stock. The adapter rings 32 interfit with the flange members 34, as shown, reinforcing and holding them in position. The abutment ring 30, and a similarly positioned ring 40 associated with the fitting 10, are welded respectively to the fittings so as to encompass the welds 38 and anchor the adapter rings 32 and resultingly the flange members or pieces 34 firmly in position.

In accordance with the present invention the tubing corrugations are encompassed within a series of reinforcement rings, the detailed construction and shaping of which, in the preferred embodiment shown, are best illustrated in Fig. 7. It will be seen that each reinforcement ring, generally designated by the numeral 42, is specifically comprised of a pair of annular channel-like members 44 and 46, in back to back relation, and welded together as indicated at 48. The ring members 44 and 46 may be formed of sheet metal, and stamped into channel shape, and thereafter welded together to form the completed integral reinforcement ring. It will be seen that each ring member is comprised of an inner flange portion and an outer flange portion, secured together by a connecting web. Thus, ring member 44 is specifically comprised of an inner flange 50, an outer flange 52, and a connecting web 54, whereas the ring member 46 is specifically comprised of an inner flange 56, an outer flange 58 and a connecting web 60. The flanges 50 and 56 project away from each other, and collectively bridge the space between the necks or passages 62 of the nodal type tubing corrugations. The tubing corrugations, designated by the numeral 64, lie freely between the ring member webs, and within the loosely telescoping outer flanges 52 and 58. In Fig. 7 the parts are shown in a normal or intermediate position. In Fig. 8 the parts are shown in their maximum collapsed or contracted position. It will be seen that the outer ring flanges 52 and 58 are brought into engagement, to limit the contracting movement, prior to the closing of the corrugation neck portions 62, so that the internal chambers of the corrugations are continuously in communication with the bore of the tubing under all service conditions. In the embodiment of Figs. 6–8, the extension of the tubing structure will be limited by the engagement of the abutment rings 26—30, Fig. 6, precluding excessive extension of the tubing structure, and separation of the telescoping outer flanges of the reinforcement rings beyond a predetermined amount.

It will be seen that in the functioning of the structure shown, the reinforcement rings have pressure engagement with the tubing corrugations only at the points indicated by the numerals 66 and 68, Fig. 7, the nodal corrugation otherwise lying freely within the chamber or housing formed by the web portions and outer flanges of the reinforcement rings, whereby the corrugations are free to flex in accordance with their own inherent characteristics of resiliency, and thus to best withstand the internal fluid pressure as the expansion joint shifts, and in all positions of operation. At the same time the reinforcement rings protect the tubing convolutions from accidental impact from external tools or the like, and in the event of tubing wall rupture, at high pressure, will retard the escaping fluid so as to minimize the explosion hazard in the operation of the structure. Further, the telescoping outer flanges 52 and 58 of the rings limit collapsing movement of the structure, and also by their maintained telescoping position even when the joint is expanded, limit lateral bending of the tubing to a degree determined by the space 70, Fig. 7, between the flanges. In this manner, the reinforcement rings, coupled with the action of the abutment members 26, 28 and 30 limit all movements of bending and extension, to which the joint may be subjected, so that the pressure carrier or tubing 14 is called upon merely to resist the internal fluid pressures; and as previously stated, the nodal tubing corrugations are free to flex, and find their proper position in all extensive positions of the structure, solely in accordance with the forces of the internal fluid pressure action.

The sleeve 16, previously described, further protects the structure, and the adapter rings 32 and associated flange pieces 34 provide firm anchorage for the ends of the tubing resistive to intense or extremely high contained fluid pressures.

In accordance with the present invention the reinforcement rings 42 serve the dual purpose of reinforcing rings, when the structure is in service, and they also are utilized as the means for forming the nodal tubing corrugations. This is illustrated in Figs. 3 and 4.

Referring to Fig. 3, an apparatus for forming the tubing corrugations hydraulically is diagrammatically illustrated, which comprises a pair of opposed heads 74 and 76 arranged to grip the opposite ends of the cylindrical tubing sheet 14, in a fluid-tight manner. The head structure 74 is further provided with an inlet conduit 78 and an exhaust conduit 80, controlled, respectively, by valves 82 and 84, by which pressure conditions within the tubing may be controlled; and with means 86 for moving the head structures 74 and 76 relatively toward and away from each other in a controlled manner.

In forming the tubing the reinforcement rings 42, after forming an assembly, as heretofore described, are mounted at predetermined spaced intervals along the tubing, and the ends of the tubing are secured to the apparatus heads 74 and 76, as described. By manipulation of the valves 82 and 84, coupled with the longitudinal compressing of the heads 74 and 76 toward each other, in a controlled manner, the tubing 14 may be subjected to internal hydraulic pressure and simultaneous endwise or longitudinal collapsing pressure, whereby to form the tubing corrugations between the webs of the reinforcement rings, as illustrated in Fig. 4. In this operation the sole pressure engagement between the tubing wall surfaces and the reinforcement rings is at and along the inner flanges 50 and 56 of the reinforcement rings, whereby nodal type corrugations are formed into the tubing, as shown.

It has been found that by controlling the relative magnitudes of the internal hydraulic forming pressure, and the endwise movements of the shifting device 86, and by controlling the degree of stretch or working imparted to the tubing wall, the shaping of the nodal corrugation, within limits, can be controlled. Thus in Figs. 1–4 and 6–8, heretofore described, the nodal corrugation has been shown of essentially or substantially circular cross section. In Fig. 5 a modified nodal shaping is shown, wherein the crest of the corrugations are flattened or of greater radius of curvature, as indicated at 90. For example, if in shaping the tubing an initial stretch or working of the metal is effected in the portion 90 of the tubing wall, this portion is thereby stiffened so that in subsequent shaping of the tubing it will assume a curvature as shown, of greater radius than other tubing wall portions later deformed. In all instances, however, it will be seen that the shaping of the corrugation, in accordance with the method shown, is effected solely by the internal hydraulic pressure and longitudinal collapsing forces, the latter being exerted by contact with only those neck portions of the tubing between the corrugations, so that the corrugation wall surfaces are formed by fluid and internal applied stresses, rather than by the shaped contact of the reinforcement rings. The reinforcement rings, in accordance with the forming method described, are preferably of integral or continuous annular construction, so that as the tubing is formed, the rings are permanently arranged in position between the tubing corrugations.

By variations and control of the internal forming and longitudinal collapsing forces, and by control of the magnitude of stretch applied to the tubing metal, various specific nodal shapes may be formed, irrespective of the specific cross sectional shaping of the reinforcement rings, and with the same ring shape.

In Fig. 9 an embodiment is illustrated wherein the reinforcement rings 42a, corresponding in structure and function with the ring 42 previously described, are of cast rather than sheet metal, and of one piece construction. In this instance the lateral bending of the expansion joint is limited by the rings, by virtue of the engagement between an annular tongue or rib 92 formed at one side of each ring, and which engages within a companion groove 94 formed in each ring on the other side thereof. Abutment of the outer flange portions of the reinforcement rings limits the axial collapsing movement of the expansion joint; whereas in this instance the axial elongation is limited by a series of sheet metal channel members 96 having their flanges engaged into external grooves 98 formed in the rings.

In the embodiment of Fig. 9 the manner of cooperation between the tubing corrugations and the reinforcement rings, and the manner in which the rings may be used to form the tubing corrugations, is the same as in the previously described embodiments, and should be readily understood.

It is obvious that various changes may be made in the specific embodiments set forth without departing from the spirit of the invention. Accordingly, the invention is not to be limited to the particular structures and methods described, but only as indicated in the following claims.

The invention is hereby claimed as follows:

1. The method of making a flexible tubing structure which comprises disposing a plurality of reinforcement rings of integral annular construction and having substantially cylindrical tube engagement portions at predetermined spaced points along a cylindrical tubing member, each of said rings also having a web portion extending radially and centrally from said engagement portion and an outer annular flange portion extending axially from said web portion, locating said rings with said outer annular flange portions in axially spaced relationship, subjecting the tubing member to internal fluid pressure and simultaneously to axial collapsing pressure, while leaving the tubing portions between said rings unconfined, whereby to form a plurality of annular corrugations between said rings the shaping of which is determined solely by said fluid and axial pressures and to axially collapse said tube and shift said rings toward each other and the outer flange portions thereof into overlapping relationship, and relieving said fluid pressure before said corrugations are forced into engagement with the web and flange portion of said rings.

2. The method of making a flexible tubing structure which comprises disposing a plurality of reinforcement rings of integral annular construction having substantially cylindrical tube engagement portions at predetermined spaced points along a cylindrical tubing member, each of said rings also having a web portion extending radially and centrally from said engagement portion and an outer annular flange extending axially from said web portion, locating said rings with said outer annular flange portions in axially spaced relationship, subjecting the tubing member to internal fluid pressure and simultaneously to axial collapsing pressure, while leaving the tubing portions between said rings unconfined, whereby to form a plurality of annular corrugations between said rings the shaping of which is determined solely by said fluid and axial pressures and to axially collapse said tube and shift said rings toward each other and the outer flange portions thereof into overlapping relationship, relieving said fluid pressure before said corrugations are forced into engagement with the web and flange portions of said rings and welding end fittings annularly to the tubing ends while said rings remain on the tubing between said corrugations, whereby to form a reinforced expansion joint.

3. A flexible tubing structure comprising a one-piece tubing having substantially cylindrical sections and spaced annular corrugations of the nodal type integrally joined with said sections by neck portions of limited radial extent substantially less than the radial extent of said corrugations, a plurality of reinforcement rings embracing the tubing between the corrugations thereof and each of said reinforcement rings comprising a pair of sheet metal channel-shaped members axially facing and secured together in back to back relation, each of said channel-shaped members comprising an inner axially extending and radially narrow flange portion engageable with and of substantially the same radial extent as the tubing neck portions between the nodal corrugations, each said channel member further including a radially extending web portion projecting from a corresponding inner flange portion with the web portions of adjacent channel-shaped members secured together and disposed generally centrally between and axially spaced from opposite ends of the inner flange portions and substantially entirely spaced from the nodal corrugations, each radially extending web portion terminating in an outer abutment flange portion with the outer abutment flange portion of one channel-shaped member radially offset from the outer abutment flange portion of the other connected channel-shaped member such that the outer abutment flange portions of adjacent reinforcement rings telescope with one another for limiting axial contraction of the tubing corrugations and preventing any substantial contact between the nodal corrugation and the reinforcement rings, and the connected radially extended web portions of the reinforcement rings being spaced from each other a distance at least as great as the axial extent of one of said nodal corrugations in all operative axially extended and collapsed conditions of the tubing.

4. A flexible tubing structure comprising a one-piece tubing having substantially cylindrical sections and spaced annular corrugations of the nodal type integrally joined with said sections by neck portions of limited radial extent substantially less than the radial extent of said corrugations, a plurality of reinforcement rings embracing the tubing between the corrugations thereof, each of said reinforcement rings comprising an inner axially extending and radially narrow flange portion egageable with and of substantially the same radial extent as the tubing neck portions between the nodal corrugations, each said reinforcement ring further including a radially extending web portion projecting from a connection with said inner flange portion and disposed generally centrally between and axially spaced from opposite ends of said inner flange portion and substantially entirely spaced from the nodal corrugations, said radially extending web portions of the reinforcement rings being spaced from each other a distance at least as great as the axial extent of one of said nodal corrugations in all operative axially extended and collapsed conditions of the tubing, each radially extending web portion terminating in an outer abutment flange portion for limiting axial contraction of the tubing corrugations and preventing any substantial contact between the nodal corrugation and the reinforcement rings, and annular members encircling and engaging adjacent reinforcement rings for limiting movement of adjacent reinforcement rings axially away from each other.

References Cited in the file of this patent

UNITED STATES PATENTS

| | | |
|---|---|---|
| 1,691,040 | Badger | Nov. 13, 1928 |
| 1,871,219 | Lord | Aug. 9, 1932 |
| 2,106,495 | Debor | Jan. 25, 1938 |
| 2,106,496 | Debor | Jan. 25, 1938 |
| 2,240,694 | Gamble | May 6, 1941 |
| 2,337,038 | Fentress | Dec. 21, 1943 |
| 2,418,800 | Wilson | Apr. 8, 1947 |
| 2,434,224 | Paul | Jan. 6, 1948 |
| 2,489,844 | Zallea | Nov. 29, 1949 |
| 2,565,296 | Chyle | Aug. 21, 1951 |
| 2,568,923 | McNeary | Sept. 25, 1951 |
| 2,699,959 | Zallea | Jan. 18, 1955 |
| 2,707,117 | Fentress | Apr. 26, 1955 |
| 2,713,503 | Ekholm | July 19, 1955 |

FOREIGN PATENTS

| | | |
|---|---|---|
| 106,249 | Austria | Dec. 23, 1898 |